(12) United States Patent
Saleem et al.

(10) Patent No.: US 12,030,034 B1
(45) Date of Patent: Jul. 9, 2024

(54) MULTI-LAYERED SORBENT STRUCTURE AND A METHOD FOR ENHANCING OIL UPTAKE PERFORMANCE THEREOF

(71) Applicant: KING FAISAL UNIVERSITY, Al-Ahsa (SA)

(72) Inventors: Junaid Saleem, Doha (QA); Sk Safdar Hossain, Al-Ahsa (SA); Zubair Khalid Baig Moghal, Doha (QA); Gordon McKay, Doha (QA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/237,504

(22) Filed: Aug. 24, 2023

(51) Int. Cl.
| | |
|---|---|
| *B01J 20/26* | (2006.01) |
| *B01J 20/28* | (2006.01) |
| *B01J 20/30* | (2006.01) |
| *C02F 1/28* | (2023.01) |
| *C02F 101/32* | (2006.01) |

(52) U.S. Cl.
CPC ....... *B01J 20/261* (2013.01); *B01J 20/28035* (2013.01); *B01J 20/3064* (2013.01); *C02F 1/288* (2013.01); *C02F 2101/32* (2013.01)

(58) Field of Classification Search
None
See application file for complete search history.

(56) References Cited

U.S. PATENT DOCUMENTS

2018/0065105 A1* 3/2018 Song ................. B01D 69/1214

FOREIGN PATENT DOCUMENTS

| | | |
|---|---|---|
| GB | 2600490 A | 5/2022 |
| JP | H0838892 A | 2/1996 |

OTHER PUBLICATIONS

Hoshikawa; JPH0838892A; translation provided by Google Feb. 1, 2024.*
Hussen et al.; Effect of Ultrasonic Welding Process Parameters on Seam Strength of PVC-Coated Hybrid Textiles for Weather Protection; Journal of Industrial Textiles; vol. 51, Issue 2, pp. 2960S-3003S; Jun. 2022.*
Saleem, et al., "Up-cycling plastic waste into swellable super-sorbents", Journal of Hazardous Materials, vol. 453, pp. 1-14, First available online Apr. 5, 2023.

* cited by examiner

*Primary Examiner* — Guinever S Gregorio
(74) *Attorney, Agent, or Firm* — Nath, Goldberg & Meyer; Richard C. Litman

(57) ABSTRACT

A multi-layered oil sorbent formed from two superposed polyolefin thin films and a polypropylene (PP) fibrous thin sheet sandwiched between the two superposed polyolefin thin films. Each of the two superposed polyolefin thin films include a plurality of pores defined therethrough and a plurality of swellable cavities extending from a surface thereof. In an embodiment, the cavities of each two superposed polyolefin thin films extend from a respective polyolefin film surface toward the PP fibrous thin sheet. The two superposed polyolefin thin films with the PP fibrous thin sheet sandwiched therebetween are sealed together by a zigzag-shaped heat seal. The plurality of cavities on the surface of the multi-layered sorbent can swell when contacted with oil. The cavities coupled with the zigzag-shaped seal maximize the available volume for uptake of oil and organic pollutants from water.

6 Claims, 6 Drawing Sheets

MULTI-LAYERED SORBENT STRUCTURE AND A METHOD FOR ENHANCING OIL UPTAKE PERFORMANCE THEREOF

BACKGROUND

1. Field

The present disclosure relates to a multi-layered polyolefin-based sorbent and, more particularly, to a multi-layered sorbent comprising two porous polyolefin films with cavities and a fibrous thin sheet of polypropylene there between

2. Description of the Related Art

Commercial sorbent pads and sheets typically comprise nonwoven polypropylene fabric with a thickness ranging from 100 to 1000 μm. These films are stacked to make a thick sorbent pad. They are produced by spinning polypropylene using heat and air into long fluffy fibers or threads, followed by pressing the fibers together between hot rollers to get a flexible solid fabric thin film. As the minimum thickness of these pads is 5 mm, a limited number of conventional pads may be stored in a given space. Additionally, when contacted with thin, water-borne oil films, conventional pads and sheets float below the oil surface and in the water, thereby picking up undesirable water. Lastly, conventional nonwoven fabric pads are for one-time use only, as oil recovery from these pads is 30 to 40% by means of mechanical squeezing and without any chemical treatment.

Accordingly, there is a need to prepare thin films that can effectively remove oil and can be stored in a smaller space compared to conventional, thick sorbent pads and sheets. Although a number of thin film sorbents with micropores have been made using polyethylene and polypropylene, the thickness of these microporous single thin film sorbents is on average 10 μm. Thus, oil uptake capacity is limited.

Several efforts have been made to enhance the uptake capacity by stacking two thin films and then heat-sealing in a straight line or in a zigzag-shaped. Although these stacked, heat-sealed films absorb and hold more oil compared with a single thin film due to the trapping of oil in the seal, there is a need for higher oil absorbing and retaining capacities.

Thus, new sorbents for oil uptake solving the aforementioned problems are desired.

SUMMARY

The present subject matter relates to a multi-layered oil sorbent formed from two superposed polyolefin (PO) thin films and a polypropylene (PP) fibrous thin sheet sandwiched between the two PO thin films. In an embodiment, each of the PO thin films include a plurality of pores defined therethrough and a plurality of swellable cavities extending from a surface thereof. In an embodiment, the cavities of each PO film extend from a respective PO film surface toward the PP fibrous thin sheet. The PO films with the PP fibrous thin sheet sandwiched there between are sealed together by a zigzag-shaped heat seal. The plurality of cavities on the surface of the multi-layered sorbent can swell when contacted with oil. The cavities coupled with the zigzag-shaped seal can maximize the available volume for sorption of oil and organic pollutants from water.

In one embodiment, a multi-layered oil sorbent can include two superposed polyolefin (PO) thin films having a plurality of pores extending therethrough and a polypropylene (PP) fibrous thin sheet sandwiched between the two PO thin films. In an embodiment, each of the PO thin films can include a plurality of swellable cavities, the cavity walls of each PO film extending from the respective PO film surface toward the PP fibrous thin sheet.

In an embodiment, a method of absorbing oil and organic pollutants from water can include contacting the water with an oil sorbent, the oil sorbent comprising two superposed polyolefin (PO) thin films having a plurality of pores extending therethrough and a polypropylene (PP) fibrous thin sheet sandwiched between the two PO thin films. In an embodiment, each of the PO thin films include a plurality of swellable cavities. Once contacted, the oil sorbent can absorb oil and organic pollutants from the water, thereby treating and/or cleaning the water.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a multi-layered oil sorbent formed from two superposed polyolefin thin films and a polypropylene (PP) fibrous thin sheet sandwiched between the two superposed polyolefin thin films. In an embodiment, each of the two superposed polyolefin thin films includes a plurality of pores defined therethrough and a plurality of swellable cavities extending from a surface of each film. In an embodiment, the plurality of cavities of each two superposed polyolefin thin films extend toward the PP fibrous thin sheet. The two superposed polyolefin thin films with the PP fibrous thin sheet sandwiched therebetween can be sealed together by a zigzag-shaped heat seal. The oil sorbent can absorb oil and organic pollutants from a water surface and retain the oil and organic pollutants therein. For example, the oil sorbent can absorb at least about 98% of oil that contacts the oil sorbent. The oil sorbent can be recycled multiple times with high efficiency.

In an embodiment, polyolefin, as used herein, includes one or more of PP (polypropylene), PE (polyethylene), e.g., UHMWPE (ultrahigh molecular weight polyethylene), LLDPE (linear low-density polyethylene), LDPE (low-density polyethylene), and HDPE (high-density polyethylene). In an embodiment, the polyolefin can include a combination of UHMWPE (ultrahigh molecular weight polyethylene) and HDPE (high-density polyethylene).

Figure 1A:
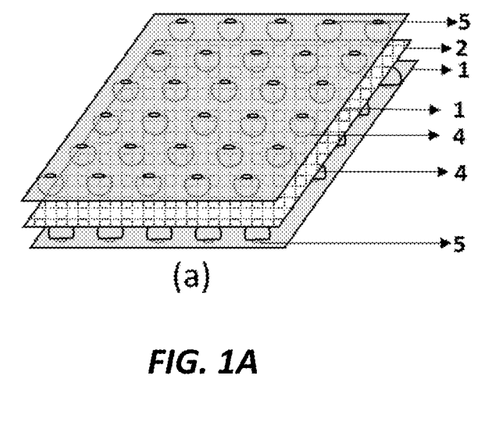
FIG. 1A is a top view, schematic representation of the multi-layered sorbent including a pair of superposed polyolefin films with cavities sandwiching a PP fibrous thin sheet.
Figure 1B:
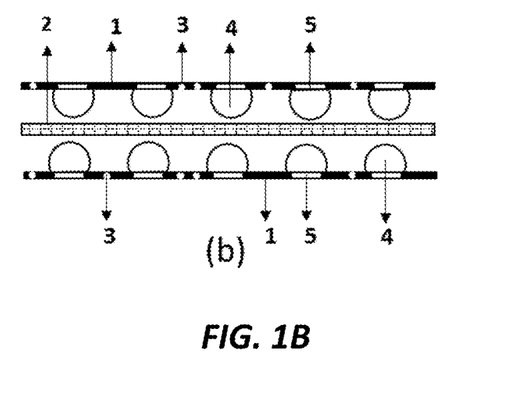
FIG. 1B is a schematic representation of a cross-sectional view of the multi-layered sorbent shown in FIG. 1A.

As shown in FIG. 1A, the multi-layered sorbent includes superposed polyolefin thin films 1 sandwiching a PP fibrous thin sheet 2. Each of the polyolefin thin films 1 includes pores 3, cavities 4 with an upper cavity opening 5, and a PP fibrous thin sheet 2. The porosity of the thin film can range from about 1% to about 82%. In an embodiment, the polyolefin thin films can include over one hundred cavities on a surface thereof. Each of the cavities are capable of swelling twenty to thirty times the thickness of the polyolefin thin film.

In an embodiment, a thickness of the multi-layered oil sorbent can range from about 4 μm to about 100 μm. In an embodiment, a tensile strength of the multi-layered oil sorbent can be about 80 MPa. In an embodiment, an area of the multi-layered oil sorbent can range from about 1 $cm^2$ to about 1296 $cm^2$. In an embodiment, a diameter of the multi-layered oil sorbent can range from about 1 cm to about 36 cm.

Figure 2A:
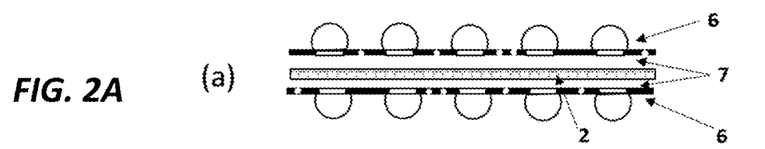
FIGS. 2A-2C are schematic representations showing (2A) superposing thin films with cavities of both thin films extending from the film surface away from the PP fibrous thin sheet; (2B) superposing thin films with one thin film having cavities extending from the film surface away from the PP fibrous thin sheet and another thin film having cavities extending from the film surface towards the PP fibrous thin sheet; and (2C) superposing thin films with cavities of both films extending from film surfaces towards the PP fibrous thin sheet.
Figure 2B:
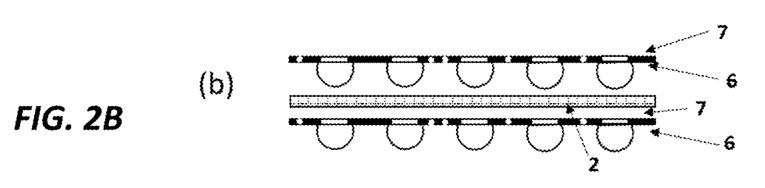
Figure 2C:
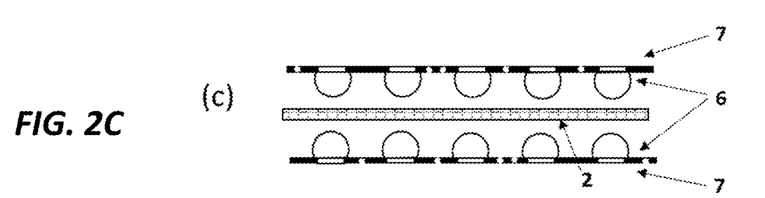

The polyolefin thin films can be superposed in any suitable manner. FIGS. 2A-2C show two polyolefin films superposed in three different ways. FIG. 2A shows the superposing polyolefin thin films with cavities of both polyolefin thin films extending from the respective film surface away from the PP fibrous thin sheet. FIG. 2B shows the cavities of one polyolefin thin film extending from the film surface toward the PP fibrous thin sheet and another polyolefin thin film with cavities extending from the film surface away from the PP fibrous thin sheet. FIG. 2C shows the superposing polyolefin thin films with cavities of both polyolefin thin films extending from the respective film surface towards the PP fibrous thin sheet.

In FIG. 2A, the cavity openings and inner film surfaces 7 of the polyolefin films are facing each other. In this superposing position, the volume between the two layers is the lowest. As such, the storage capacity or trapping volume is also the lowest. In FIG. 2B the cavity openings and inner film surface 7 of one polyolefin thin film faces the outer surface 6 of the other polyolefin thin film. In this superposing position, the volume between the two film layers is more than the volume of that achieved by the superposing position depicted in FIG. 2A. Here, the volume is increased because the space between the two films is increased. In FIG. 2C, where the outer surfaces 6 of both thin films are facing each other, the space between the two films is maximized and, as such, can accommodate more volume through swelling of the cavities.

It should be understood however, that in all the superposing positions shown in FIGS. 2A-2C, the retention of oil between the two films is low as the two different films are not physically connected nor sealed. As such, the films slip and are left with much less volume uptake capacity than expected. Hence, sealing is preferred to maintain the structure and increase the uptake capacity.

When the two polyolefin thin films are heat sealed together in a straight-line direction, the space inside the channels created after sealing is enhanced to an extremely high volume when compared to two thin films superposed and sealed without cavities. In this straight-line heat seal, retention capacity is high when compared to other thin films without cavities. The oil channeled inside the cavity can create cohesive forces that retain more oil and thus increase the capacity. However, the design of the sealing does not resist the gravitational dripping because the contact angle formed by the sealing can be 180°, which results in slipping of oil. Thus, an angled sealing is preferred over straight sealing, as the angle can create more retention forces between the thin film and the oil.

Figure 3:
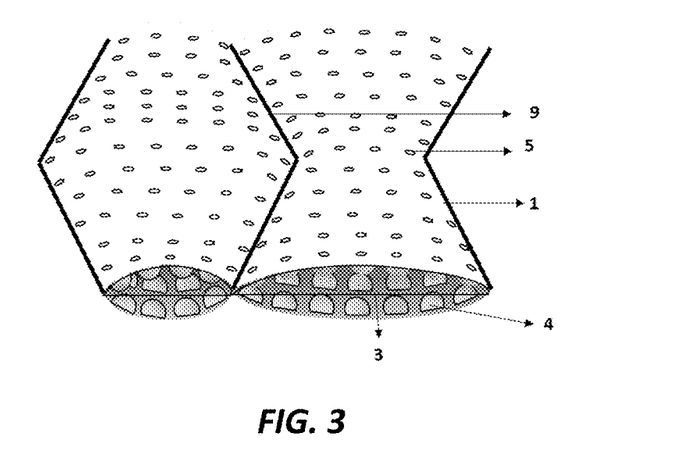
FIG. 3 is a perspective view of the multi-layered sorbent showing the PO films sandwiching the PP fibrous thin sheet and heat-sealed together in a zigzag shape.

FIG. 3 is a schematic representation of the multi-layered sorbent heat-sealed in a zigzag pattern. When the two polyolefin sheets are heat sealed in a zigzag pattern, the volume inside the channels is enhanced to an extremely high capacity when compared to two sheets sealed in a straight pattern. In an experiment, heat sealing in a zigzag pattern, with the polyolefin films superposed as shown, resulted in a high-volume increase in size with high retention capacity.

It is believed that the zigzag sealing enhances retention capacity. When the angle between the two arm portions of the zigzag seal is around 60°, the retention is enhanced as the affinity of oil towards the film is increased and overcomes the gravitational forces that make the oil slip. Thus, the retained oil inside the arm portions can further attract the oil inside the channel, thereby enhancing the retention capacity. In addition to the retention forces created by the curvature angle, the capillary action caused by the micropores and cohesive forces of the super-oleophilic thin film towards the oil can also be enhanced. Moreover, the retention forces inside the cavities can also enhance the oil uptake capacity and restrict oil dripping. Overall, the synergistic effect of retention and attraction forces by the curvature angle, adhesive forces of the oil inside the cavity, cohesive forces of the super-oleophilic thin film, and capillary action of the micropores can result in an extremely high retention of oil.

Figure 4A:
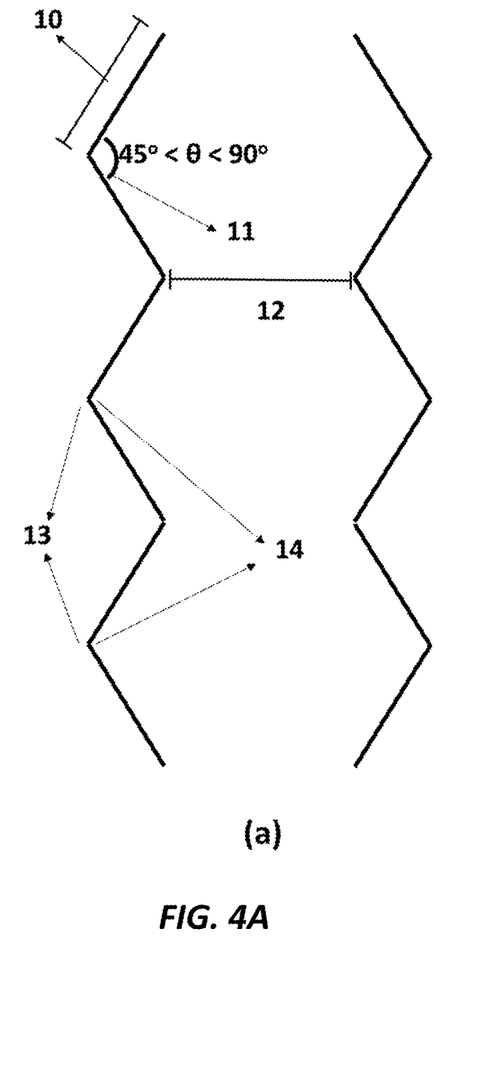
FIGS. 4A-4B are schematic representations of the zigzag sealing pattern, showing the arm portions, angle of bending or curvature, the distance between two arm portions, peaks, and valleys of the sealing pattern.
Figure 4B:
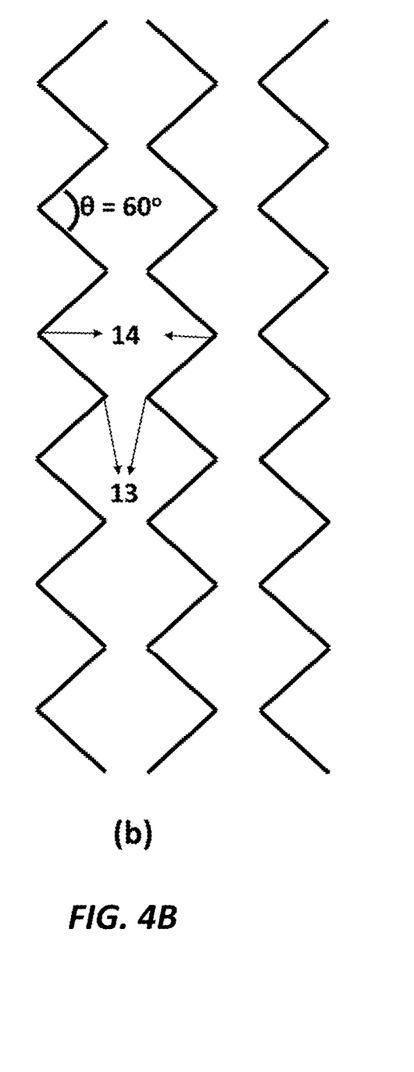

FIG. 4 shows a schematic representation of the zigzag heat seal, showing arm portion 10, angle of curvature or bending 11, distance between the two adjacent zigzag heat seals 12, peaks or exposed position 13, and valleys 14. Arm portion 10 is the length of the arm that connects one bending to the other. The angle of curvature is important in zigzag heat seal because the thin film is super oleophilic and shows high affinity towards oil. Thus, when the angle is less than 45°, the oil is trapped and will not flow easily. If the angle of curvature is more than 90°, then the retention forces by the thin film for the oil is overcome by gravitational forces and tend to slip from the thin film. Thus, it is observed that the optimum angle for maximum retention is in the range of 45° and 90°. In addition, the length of the arm should not be too long as the forces of attraction created by the curvature angle can be weakened and the surface tension will dominate. The distance between the two adjacent heat seals is also significant because a channel should be formed therebetween for oil passage.

When a zigzag heat sealing is carried out, the resulting pattern includes peaks 13 and valleys 14. As used herein, peaks refer to the outer curvature or exposed region of the heat seal and the valleys refer to the inner curvature region of the heat seal.

Figure 5A:
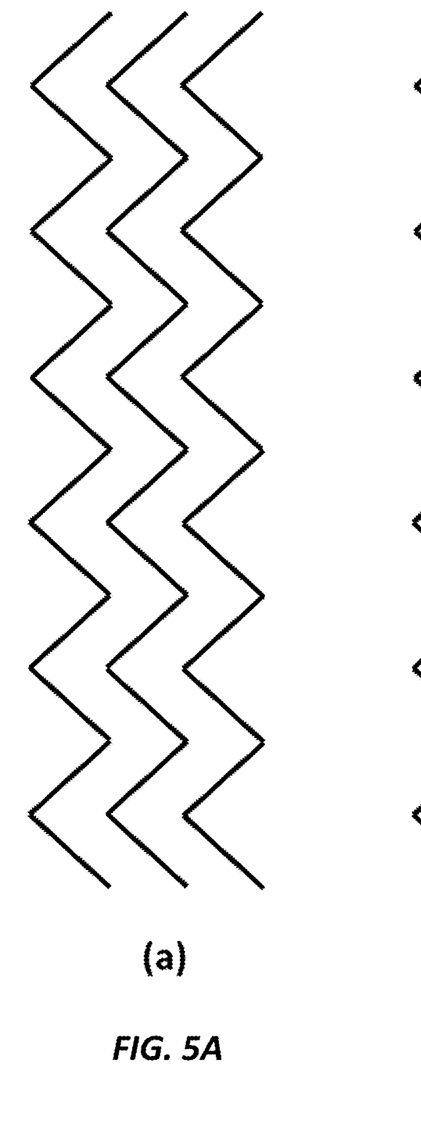
FIGS. 5A-5B are schematic representations of an alternative heat seal pattern with arm portions extending in different directions.
Figure 5B:
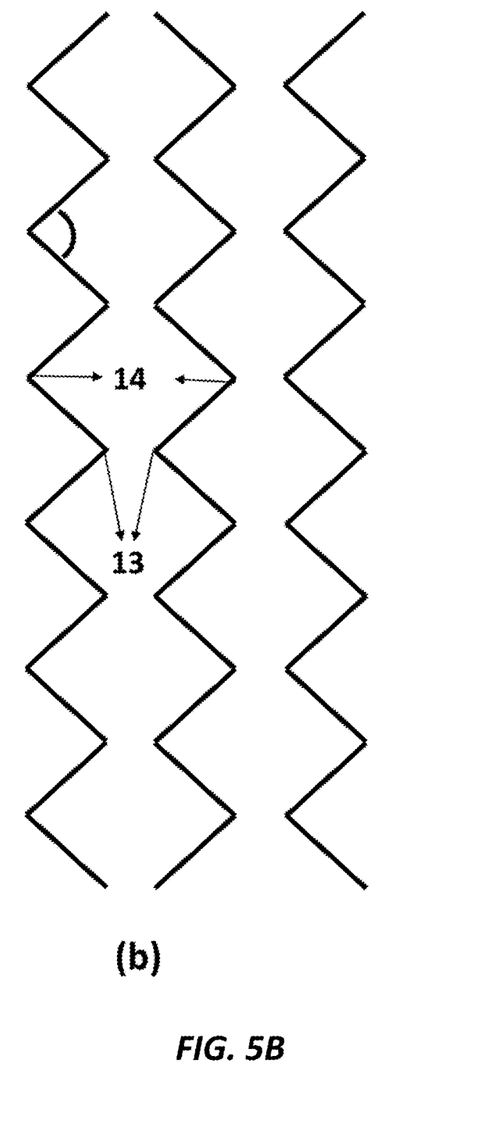

When the peak of one arm portion faces a valley 14 of another arm portion, the sealing forms symmetrical channels. In this type of sealing, as shown in 5A, the retention of the oil is less compared to the oil retained by the sealing shown in FIG. 5B. In FIG. 5B, one peak of one arm portion faces another peak of another arm portion. In this type of sealing, the space between the two heat seals serves as a reservoir, thereby enhancing retention capacity. For oil recovery, the multi-layered sorbent can be mechanically pressed to allow oil to exit from the channels.

The oil sorbent can be formed by a simple and cost-effective method. In one embodiment the oil sorbent can be formed by dissolving an organic polymer in an organic solvent to obtain a solution; adding an inorganic filler to the solution until well-dispersed; applying the solution onto a solid substrate by spin-coating to obtain a multi-layered thin film; subjecting the thin film to heat; and extracting out the inorganic filler to obtain a thin film with cavities, pores, and macro-voids. In an embodiment, the two films can be superposed such that the cavities of each of the films are facing each other, a PP fibrous thin sheet can be positioned between the two films to maximize the available volume for oil uptake, and the superposed films can be heat-sealed in a zigzag-shaped to produce a super-sorbent, multi-layered thin film.

In an embodiment, the organic polymer is a polyolefin. In an embodiment, the polyolefin is dissolved in an organic solvent under reflux conditions and an inorganic filler is added and mixed for a time period ranging from about 5 minutes to about 30 minutes or until a well-dispersed solution is achieved. In an embodiment, the solid substrate is heated or "pre-heated" before the spin coating. The preheat temperature for the solid substrate ranges from about 30° ° C. to about 160° C. but below the boiling point of the solvent. The solvent to polymer ratio can range from 1 mg/ml to 200 mg/ml. The loosely connected porous polymer thin film can be subjected to heat at a controlled temperature to melt the polymer and to realign the polymer chains into a high crystalline strong film by cross-linking the polymeric chains.

In an embodiment, the solid substrate can be placed on a spin coating holder or chuck and the polymer solution can be poured on the solid substrate (preheated or non-preheated)

followed by spin-coating. The spin coating can last for a period of time ranging from about 1 minute to about 10 minutes at about 100 rpm to about 6000 rpm. The polymer can be heated at a controlled temperature post spin coating, referred to herein as "post-heat". This post-heat temperature can range from about 30° ° C. to about 170° C. or up to the melting point temperature of the polymer.

In an embodiment, the organic solvent can be p-xylene and the preheat temperature can be about 120° C., as the boiling point of p-xylene is 138° C. In an embodiment, the speed of the rotation can be programmed in three stages. The initial stage can be at about 600 rpm for about 5 seconds, followed by about 1000 rpm for about 60 seconds in the second stage, and finally about 3000 rpm for about 60 seconds in the last stage. The post-heat temperature can be maintained at about 130° C. for a period of about 5 seconds to about 30 minutes. This post-heat treatment can achieve micropores.

After the completion of spin coating, the solid substrate with thin film can be detached from the chuck or spin coater. In one embodiment, the solid substrate with the polymer thin film can be heated to at least the melting point temperature of the polymer. The heating of the solid substrate with thin film after the spin coating is termed here as "post-heat." The post heat treatment can range from about 20° C. to about 170° C. or at a temperature up to the melting point of polymer(s) or above for a time ranging from 5 seconds to 30 minutes. In an embodiment, the post-heated thin film can be peeled off of the substrate easily to provide an independent, strong and porous thin film without any support. The post-heated thin films can be washed to extract out the inorganic filler (in this case sodium chloride) using water, thereby obtaining a porous thin film.

In an embodiment, the polypropylene (PP) fibrous thin sheet can be made by heating a PP nonwoven fabric in a hot air oven at a temperature of about 80° C. for about 5 minutes to enhance the flexibility and compatibility with the PP porous fibrous thin sheet. The PP fibrous thin sheet can then be sandwiched between the porous polyolefin thin films. The PP fibrous thin sheet can serve as a separator, support, or facilitator for oil penetration, and as a facilitator for quick disposal of oil. In an embodiment, a commercially available polypropylene nonwoven fabric may be used. For example, a commercially available polypropylene (PP) nonwoven fabric roll (thickness 30 μm and pore size of 2 mm) can be used.

In an embodiment, the organic solvent can be selected from p-xylene, m-xylene, o-xylene, an isomeric mixture of xylenes, toluene, and other compatible aromatic hydrocarbons. In an embodiment, a ratio of polyolefin to organic solvent ranges from about 1 mg/ml to about 200 mg/ml·mm. In an embodiment, the inorganic filler used in the polymer solution can be selected from sodium chloride, silica clay, barium chloride, magnesium chloride, potassium chloride, calcium chloride, and similar inorganic salts. In an embodiment, a proportion of polymer to inorganic filler can range from about 1:0 w/w % to about 1:4 w/w %. In an embodiment, the solid substrate can be selected from glass, copper, silicon, alumina, and other metal surfaces. The solid surface temperature can range from about 0° ° C. to about 1300° C. but below the boiling point of the solvent. The proportion of polymer to inorganic filler can be in the range of 1:0 w/w % to 1:4 w/w %. In an embodiment, a size of the inorganic filler can range from about 3 μm to about 200 μm. In an embodiment, the size of the inorganic filler can be greater than a size of the targeted thickness of the thin film.

In an embodiment, the thickness of the inorganic filler can range from about 3 μm to about 200 μm, or from about 150 μm to about 200 μm. In an embodiment, the volume of the cavities can range from about 9 μm$^3$ to about 0.027 mm$^3$, or from about 0.00375 mm$^3$ to about 0.008 mm$^3$. In an embodiment, the thickness of the thin film can range from about 2 μm to about 100 μm, or from about 2 μm to about 20 μm. In an embodiment, the thickness of the film covering above the inorganic filler can range from about 1 μm to about 200 μm, or from about 3 μm to about 20 μm. In an embodiment, the height of the inorganic filler can range from less than about 3 μm to about 200 μm, or from about 150 μm to about 200 μm. In an embodiment, micropores can be through pores ranging from about 500 nm to about 10 μm. Macro-voids can range from about 10 μm to about 200 μm, or from about 30 μm to about 100 μm.

In an embodiment, a size of the cavity depends on the dimension of the inorganic filler and can range from about 500 nm to about 200 μm. In an embodiment, UHMWPE (ultra-high molecular weight polyethylene) can be added to further strengthen the thin film especially in the case of HDPE-based thin film.

The PP fibrous thin sheet can be sandwiched between two porous, cavity-containing polyolefin thin films and sealed in a zigzag-shape fashion to obtain a multi-layered thin film with high retention capacity. The zigzag-shaped seal can be achieved by sealing with heat, an adhesive, stitching, or staple(s). In an embodiment, the zigzag-shaped seal can form a pattern comprising a sealing arm portion, and an opposing receiving arm position, wherein each of the arm-portions are illustrated by interlocking peaks and valleys, as shown in FIG. 4A. As shown, an arm portion can be defined by the distance between one curvature to the other curvature of the same seal, an angle is the geometry or space between two intersections of two arm portions at or close to the point where they meet, the peaks of adjacent seals can be facing each other to improve retention as shown in FIG. 4B, and the seal is the region where two or more films connect. In an embodiment, the angle between two arm portions can range from about 45° to about 90°, or about 60°. In an embodiment, a length of the arm portion can be about 5 mm for a 1600 mm$^2$ area. In an embodiment, the distance between two peak tips, created by the zigzag-shaped heat seal, can be about 5 mm for a 1600 mm$^2$ area and the diameter of the heat seal can be about 1 mm or less.

The present teachings are illustrated by the examples provided below.

EXAMPLES

Example 1

Preparation of HDPE (60 mg/ml) Multi-Layered Sorbent (HDPE:Salt 1:2)

Saturation 3 g of HDPE was taken in a round-bottomed flask. 50 ml of p-xylene was added to the round-bottomed flask and allowed to stir. The reaction mixture was heated at 130° C. until a clear solution was achieved. The polymer was dissolved in 10-20 minutes. The round-bottomed flask was connected to a reflux condenser to avoid solvent loss. 6 g of sodium chloride (size ranging between 150 μm and 200 μm) was added to the solution. The polymer reaction mixture was stirred until a uniform dispersed solution was achieved. Simultaneously, a plain glass plate of size 5 cm×5 cm was heated to 120° C. Then, the glass plate was placed on the customized spin coater chuck and the polymer reaction mixture was poured onto the hot glass surface. The lid of the spin coater was closed to avoid solvent evaporation and exposure. The spin coater was turned on and allowed to spin in three steps. The first step included spinning at 600 rpm for 5 seconds, followed by the second step including spinning at 1000 rpm for 60 seconds, and the third step including spinning at 3000 rpm for 120 seconds. After the completion of spin coating, a white powdered layer was observed with no solvent. The solid substrate was removed from the chuck and placed in a hot air oven for 25 minutes at 130° C. to form a film. Then, the thin film was peeled off easily using a tweezer. The film was washed in water for 5 minutes to remove the inorganic filler and sodium chloride, to obtain a porous HDPE thin film with cavities. Then, two of the HDPE thin films were superposed, with cavities facing each other, and heat sealed in a zigzag-shaped fashion. The reaction hotplate-stirrer and spin coater were placed side-by-side to avoid solvent exposure to the environment, and the whole setup was kept inside a fume hood. The spin coater drain was connected to a receiver to collect excess polymer and xylene. The thickness for the multi-layered sorbent achieved with this composition was 6 μm. The strength obtained for this film was 6 Mpa (see Table 1).

The tensile strength of the multi-layered sorbent prepared as described in Examples 1-3 was measured and listed in Table 1. As per the requirement of the end-user, the multi-layered oil sorbent can be modified as presented in Table 1.

TABLE 1

Tensile Strength comparison for different Polyolefins

| Example | Sample composition Polymer in Xylene [mg/ml] | Polymer to inorganic filler ratio (w/w %) | Thickness (μm) | Tensile (MPa) Strength |
|---|---|---|---|---|
| 1 | HDPE [60 mg/ml] | 1:2 | 6 | 6 |
| 2 | HDPE: UHMWPE (85:15) [30 mg/ml] | 1:2 | 5 | 26 |
| 3 | PP [60 mg/ml] | 1:2 | 5 | 7 |

The optimized values are obtained with 30% porosity, thickness of 7 μm, and tensile strength of 6 Mpa. The value of 6 Mpa is sufficient to be used in real time applications of the sorbent.

Example 2

Preparation of HDPE:UHMWPE [85:15] (30 mg/ml) Multi-Layered Sorbent (PE:Salt 1:2)

1.275 g of HDPE and 0.225 g of UHMWPE were taken in a round-bottomed flask. 50 ml of isomeric mixture of xylenes was added to the round-bottomed flask and allowed to stir. The reaction mixture was heated at 130° C. until a clear solution was achieved. The polymer was dissolved in 10-20 minutes. The round-bottomed flask was connected to a reflux condenser to avoid solvent loss. 3 g of sodium chloride (size ranging from about 150 μm to about 200 μm) was added to the solution. The polymer reaction mixture was stirred until a uniform dispersed solution was achieved. Simultaneously, a plain glass plate of size 5 cm×5 cm was heated to 120° C. Then, the plate was placed on the customized spin coater chuck and the polymer reaction mixture was poured onto the hot solid surface. The lid of the spin coater was closed to avoid solvent evaporation and exposure. The spin coater was turned on and allowed to spin in three steps. The first step included spinning at 600 rpm for 5 seconds. The second step included spinning at 1000 rpm for 60 seconds. The third step included spinning at 3000 rpm for 120 seconds. After the completion of spin coating, a white powdered layer was observed with no solvent in it. The solid substrate was removed from the chuck and placed in a hot air oven for 25 minutes at 130° C. to provide a thin film. Then, the thin film was peeled off easily using a tweezer. The film was washed in water for 5 minutes to remove the inorganic filler and sodium chloride, to obtain a porous HDPE: UHMWPE thin film layer. Then, the two HDPE:UHMWPE thin films were superposed with cavities facing each other and heat sealed in a zigzag-shaped fashion. Then, the reaction hotplate-stirrer and spin coater were placed side-by-side to avoid solvent exposure to the environment, and the whole setup was kept inside the fume hood. The spin coater drain was connected to a receiver to collect excess polymer and xylene. The thickness for the multi-layered sorbent achieved using this composition was 5 μm.

Figure 6A:
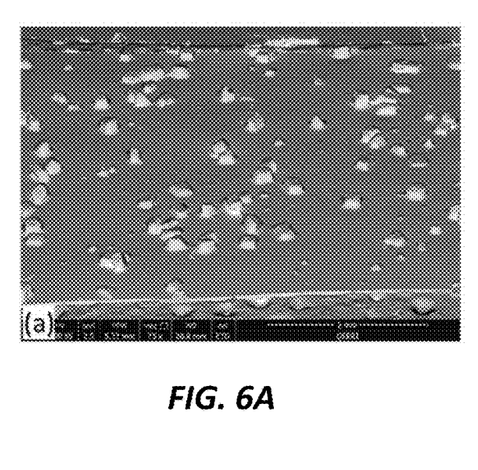
FIGS. 6A-6C show (6A-6B) scanning electron microscopy (SEM) images of the PO films with cavities; and (6C) 3D profilometry image showing the PO film with cavities.
Figure 6B:
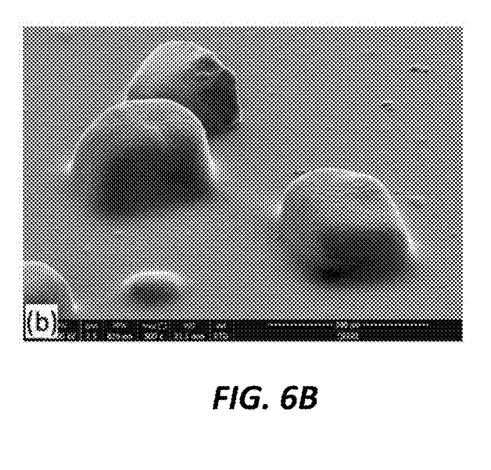
Figure 6C:
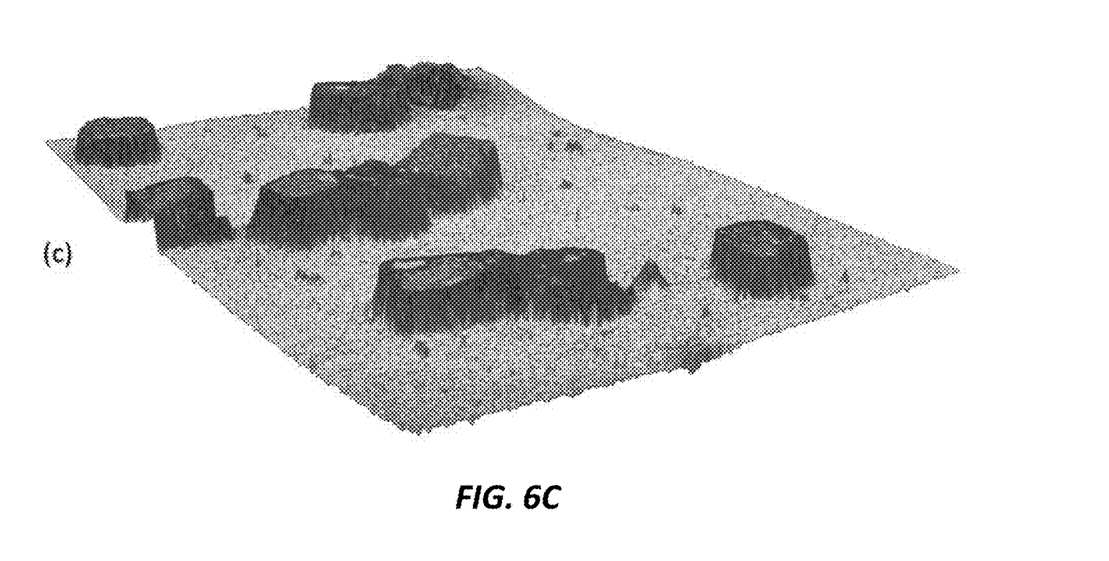

FIGS. 6A-6C show SEM images of the multi-layered sorbent. A profilometry image of the multi-layered sorbent is shown in FIG. 6C. The strength obtained for this film was 9 Mpa (see Table 1). The porosity and strength of the sorbent prepared using this formulation was investigated at different temperatures and times (Table 2).

TABLE 2

Porosity vs Strength comparison for HD:UH (85:15) porous thin film with cavities

| SN | Porosity % | [1]Thickness (μm) | [2]Temperature ° C. | Time min | Strength MPA |
|---|---|---|---|---|---|
| 1 | 75 | 20 | 25 | 0 | [3]ND |
| 2 | 71 | 18 | 130 | 5 | ND |
| 3 | 66 | 16 | 130 | 10 | 1 |
| 4 | 60 | 14 | 130 | 15 | 2 |
| 5 | 30* | 7 | 130 | 20 | 6 |
| 6 | 7 | 5 | 130 | 25 | 9 |
| 7 | <2 | 5 | 135 | 5 | 10 |

[1]initial weight of the thin film was 7 mg.
[2]Temperature should be close to the melting point of the polymer. For HDPE, meting temp is 130° C., For PP, meting temp is 160° C..
[3]Not determined-the polymer is in the form of fibers and cannot be considered as a freestanding thin film,
*Pore size range from 0.5 μm to 4 μm.

Figure 7:
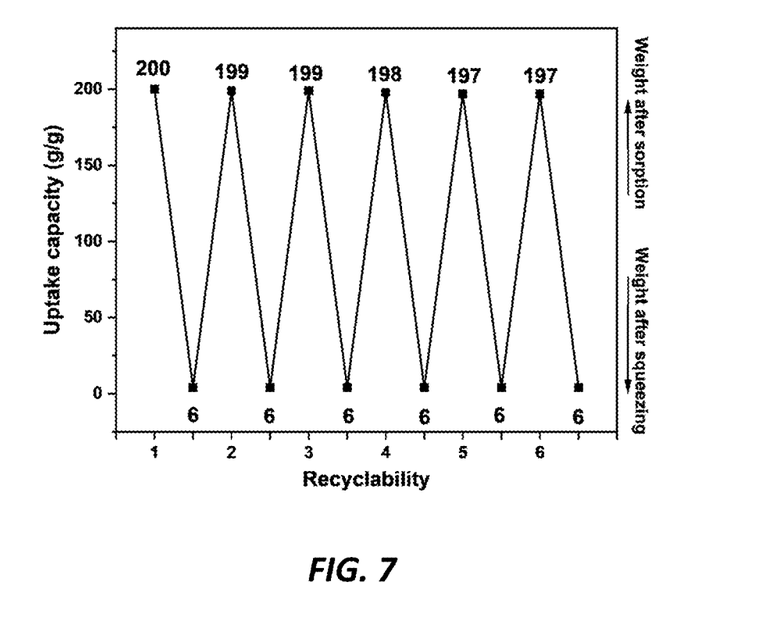
FIG. 7 is a graph showing results of a recyclability study of the as-prepared multi-layered sorbent.

A sample of the multi-layered sorbent prepared as described in Example 2 was taken with an area of 16 cm$^2$ and a thickness of 5 μm. The recyclability of the sample was studied and the results are summarized in FIG. 7. The sorbent was dipped in engine oil until saturation was achieved. The film was then removed from the oil and weighed immediately. The oil uptake capacity was found to be 200 g/g. Then, the sorbent was mechanically squeezed by pressing upper and lower surfaces to remove oil and weighed again. The residual uptake value was found to be 4 g/g, which suggested that some oil was retained inside the porous structure of the sorbent. The process was repeated several times. The oil recovery from the sample was determined to be 98%.

Example 3

PP (60 mg/ml) Thin Film (PP:Salt 1:2)

3 g of PP was taken in a round-bottomed flask. A 50 ml isomeric mixture of xylenes was added to the round-bottomed flask and allowed to stir. The reaction mixture was heated at 130° C. until a clear solution was achieved. The polymer was dissolved in 15-30 minutes. The round-bottomed flask was connected to a reflux condenser to avoid solvent loss. 6 g of sodium chloride (size ranging between 150 μm and 200 μm) was added to the solution. The polymer reaction mixture was stirred until a uniform dispersed solution was achieved. Simultaneously, a plain glass plate of size 5 cm×5 cm was heated to 120° C. Then, the plate was placed on the customized spin coater chuck and the polymer reaction mixture was poured onto the hot glass surface. The lid of the spin coater was closed to avoid solvent evaporation and exposure. The spin coater was turned on and allowed to spin in three steps. The first step included spinning at 600 rpm for 5 seconds. The second step included spinning at 1000 rpm for 60 seconds. The third step included spinning at 3000 rpm for 120 seconds. After the completion of spin coating, a white powdered layer was observed with no solvent. The solid substrate was removed from the chuck and placed in a hot air oven for 25 minutes at 160° C. to form a thin film. Then, the PP thin film was peeled off easily using a tweezer. The PP thin film was washed in water for 5 minutes to remove the inorganic filler and sodium chloride, to provide a porous thin film. Then two PP thin films were superposed, with cavities facing each other and heat sealed in a zigzag-shaped fashion. The reaction magnetic hotplate-stirrer and spin coater were placed side-by-side to avoid solvent exposure to the environment, and the whole setup was kept inside the fume hood. The spin coater drain was connected to a receiver to collect excess polymer and xylene. The thickness of the thin film achieved using this composition was 5 μm. The strength obtained for this film was 7 Mpa (see Table 1).

Example 4

Oil Uptake Studies

The oil uptake properties of the multi-layered oil sorbent (prepared as described in Example 2) were studied, including dripping kinetics, saturation kinetics and compared with commercial sorbents, as shown in Table 3, 4, and 5, respectively. Dripping kinetics is the amount of oil dripped from the thin film with respect to time. When a thin film is placed or dipped in oil, it absorbs oil until it reaches saturation. After it reaches equilibrium, the thin film is taken out, and loosely connected oil is allowed to drain. Initially, oil will drip more and as time passes, the dripping decreases. After some time, some oil is retained by the film and oil is not dripped. This is termed as retention capacity of the thin film. As shown in Table 3, the multi-layered oil sorbent reaches its equilibrium uptake value after 5 minutes of dripping, i.e., after 5 minutes there will be no more dripping of oil from the sorbent.

TABLE 3

Retention capacity profile of example 2 (HD) sorbent using Engine oil[2]

| S. No. | Dripping time (min) | Oil uptake capacity[1] (g/g) |
|---|---|---|
| 1 | 0 | 265 |
| 2 | 0.5 | 235 |
| 3 | 1 | 210 |
| 4 | 2 | 200 |

TABLE 3-continued

Retention capacity profile of example 2 (HD) sorbent using Engine oil[2]

| S. No. | Dripping time (min) | Oil uptake capacity[1] (g/g) |
|---|---|---|
| 5 | 5 | 200 |
| 6 | 15 | 200 |

[1]Oil uptake capacity with an error of ±10%.
[2]density = 0.89 kg/m$^3$.

Saturation kinetics is the time taken by the thin film to reach a saturation point, whereafter the oil cannot be absorbed more. In short, it is the maximum capacity of the oil absorbed by the thin film with respect to time. As shown in Table 4, the multi-layered oil sorbent reaches its saturation value within 5 minutes of uptake.

TABLE 4

Saturation capacity profile of example 2 (HD) sorbent using Engine oil[1]

| S. No. | Saturation time (min) | Oil uptake capacity* (g/g) | Oil uptake capacity** (g/g) |
|---|---|---|---|
| 1 | 0.5 | 120 | 80 |
| 2 | 1 | 150 | 110 |
| 3 | 2 | 180 | 150 |
| 4 | 5 | 220 | 190 |
| 5 | 15 | 265 | 200 |
| 6 | 30 | 265 | 200 |

[1]density = 0.89 kg/m$^3$.
*Oil uptake measured immediately after taking out the film from an oil bath
**Oil uptake measured after equilibrium is reached (after dripping for 5 mins)

The uptake properties of the multi-layered oil sorbent was compared with commercial sorbents. An area of 16 cm$^2$ of 3M and Chemtex commercial sorbents were cut and with an area of 16 cm$^2$ size of thin film as shown in Table 5. The equilibrium oil uptake value of the multi-layered oil sorbent was found to be 200 g/g which is much higher than the commercial sorbent pads made of a PP fibrous thin sheet.

TABLE 5

Comparison of oil uptake capacity[1] with commercial sorbents using Engine oil[2]

| S. No. | Thin Film | 3M HP-255 | Chemtex BP9W |
|---|---|---|---|
| 1* | 265 | 27 | 22 |
| 2** | 200 | 23 | 17 |

[1]Oil uptake capacity with an error of ±10%,
[2]density = 0.89 kg/m$^3$.
*Oil uptake measured immediately after taking out the film from an oil bath
**Oil uptake measured after equilibrium is reached (after dripping for 5 mins)

It is to be understood that the multi-layered sorbent is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A multi-layered oil sorbent, comprising:
   two superposed polyolefin thin films, each of the two superposed polyolefin thin films including a plurality of pores defined therethrough and a plurality of swellable cavities extending from a surface thereof; and
   a polypropylene (PP) fibrous thin sheet sandwiched between the two superposed polyolefin thin films, wherein
   the two superposed polyolefin thin films and the PP fibrous thin sheet are sealed together in a zigzag shape;
   wherein the pores have a size ranging from about 500 nm to about 10 μm.

2. The multi-layered oil sorbent of claim 1, wherein a thickness of the multi-layered oil sorbent ranges from about 4 μm to about 200 μm.

3. The multi-layered oil sorbent of claim 1, wherein an area of the multi-layered oil sorbent ranges from about 51 cm$^2$ to about 1296 cm$^2$.

4. The multi-layered oil sorbent of claim 1, wherein a diameter of the multi-layered oil sorbent ranges from about 1 cm to about 36 cm.

5. The multilayered zigzag-shaped oil sorbent of claim 1, wherein the multilayered zigzag-shaped oil sorbent comprises 500 to 800 cavities per cm$^2$ with an average of 600 cavities per cm$^2$.

6. A method of absorbing oil from a water surface, comprising contacting the multi-layered oil sorbent of claim 1 with the water and absorbing oil from the water onto the multi-layered oil sorbent.

* * * * *